United States Patent
Lutz et al.

(10) Patent No.: US 10,813,345 B2
(45) Date of Patent: Oct. 27, 2020

(54) AQUARIUM WITH WATER CHANGE SYSTEM

(71) Applicant: Elive LLC, Muskego, WI (US)

(72) Inventors: Thomas Lutz, Cedar Rapids, IA (US); Phillip Bartoszek, New Berlin, WI (US); Matthew Allen, Waterford, WI (US); Ernie Katris, New Berlin, WI (US)

(73) Assignee: Central Garden & Pet Company, Phoenix, AZ (US)

( * ) Notice: Subject to any disclaimer, the term of this patent is extended or adjusted under 35 U.S.C. 154(b) by 227 days.

(21) Appl. No.: 15/816,329

(22) Filed: Nov. 17, 2017

(65) Prior Publication Data

US 2018/0139936 A1 May 24, 2018

Related U.S. Application Data

(60) Provisional application No. 62/424,074, filed on Nov. 18, 2016.

(51) Int. Cl.
*A01K 63/10* (2017.01)
*A01K 63/06* (2006.01)
*A01K 63/00* (2017.01)

(52) U.S. Cl.
CPC ............ *A01K 63/10* (2017.01); *A01K 63/006* (2013.01); *A01K 63/06* (2013.01)

(58) Field of Classification Search
CPC ...... A01K 63/00; A01K 63/04; A01K 63/047; A01K 63/06; A01K 63/10; F16K 3/04; F16K 3/08; F16K 3/085
See application file for complete search history.

(56) References Cited

U.S. PATENT DOCUMENTS

| | | | | |
|---|---|---|---|---|
| 1,511,692 A | * | 10/1924 | Vitek | F16K 3/085 251/351 |
| 1,607,827 A | * | 11/1926 | Herrmann | F16K 3/085 251/174 |
| 1,692,467 A | * | 11/1928 | Quinlan | F16K 3/085 138/43 |
| 3,444,890 A | * | 5/1969 | Ralston | A47L 15/4217 137/562 |
| 3,780,758 A | * | 12/1973 | DeVries | F16K 3/08 137/454.6 |
| 3,923,284 A | * | 12/1975 | Stickler | F16K 3/08 251/172 |
| 4,005,728 A | * | 2/1977 | Thorp | F16K 3/08 137/270 |
| 4,453,567 A | * | 6/1984 | MacDonald | F16K 3/08 137/614.11 |
| 4,651,770 A | * | 3/1987 | Denham | F16K 3/08 137/270 |
| 4,944,248 A | * | 7/1990 | Torng | A01K 63/04 119/264 |
| 5,127,438 A | * | 7/1992 | Williams | F16K 3/085 137/562 |

(Continued)

*Primary Examiner* — Michael H Wang

(57) ABSTRACT

A water change system includes an elongate tube and a spout configured to be coupled to the elongate tube. The spout includes a first opening and a second opening spaced from the first opening. The spout is rotatable between a first position to permit water to enter the second opening and pass out of the first opening, and a second position to inhibit water from entering the second opening.

18 Claims, 8 Drawing Sheets

(56) References Cited

U.S. PATENT DOCUMENTS

| | | | | |
|---|---|---|---|---|
| 5,171,438 A | * | 12/1992 | Korcz | A01K 63/045 |
| | | | | 119/260 |
| 5,690,054 A | * | 11/1997 | Allen | A01K 63/003 |
| | | | | 119/259 |
| 5,695,654 A | * | 12/1997 | Schultz | A01K 63/006 |
| | | | | 119/264 |
| 5,779,884 A | * | 7/1998 | Raymo | A01K 63/006 |
| | | | | 119/264 |
| 5,911,402 A | * | 6/1999 | Lavoie | F16K 5/06 |
| | | | | 119/264 |
| 7,810,452 B2 | * | 10/2010 | Pieretto | A01K 63/00 |
| | | | | 119/248 |
| 8,100,087 B2 | * | 1/2012 | Fredricks | A01K 63/06 |
| | | | | 119/266 |
| 8,347,820 B2 | * | 1/2013 | Sigmon | A01K 63/04 |
| | | | | 119/259 |
| 2005/0126643 A1 | * | 6/2005 | Romero | F16K 3/08 |
| | | | | 137/606 |
| 2006/0016001 A1 | * | 1/2006 | Zhao | E03C 1/0404 |
| | | | | 4/675 |
| 2012/0192799 A1 | * | 8/2012 | Bazemore, Sr. | A01K 63/006 |
| | | | | 119/264 |

* cited by examiner

AQUARIUM WITH WATER CHANGE SYSTEM

CROSS-REFERENCE TO RELATED APPLICATIONS

This application claims priority to U.S. Provisional Application No. 62/424,074, filed Nov. 18, 2016, the entire contents of which are incorporated herein by reference.

FIELD OF THE INVENTION

The present invention relates to aquariums, and specifically to systems for changing water in aquariums.

BACKGROUND OF THE INVENTION

Fish tanks are commonly found in home and office settings, and typically include a small transparent bowl filled with water that houses one or more fish. The fish tanks are placed on a desk, or on a counter or cabinet, so that people inside the home or office are able to view and observe the fish inside the bowl. The fish tanks also commonly include an opening at the top of the bowl so that food may be added into the bowl, and so that water may be removed and added as needed.

SUMMARY

In accordance with one construction, a water change system includes an elongate tube and a spout configured to be coupled to the elongate tube. The spout includes a first opening and a second opening spaced from the first opening. The spout is rotatable between a first position to permit water to enter the second opening and pass out of the first opening, and a second position to inhibit water from entering the second opening.

In accordance with another construction, a spout configured to be coupled to an elongate tube in an aquarium includes a first end, a second opposite end, a first opening at the first end and a second opening spaced from the first opening at the second end. The spout is rotatable between a first position to permit water to enter the second opening and pass out of the first opening, and a second position to inhibit water from entering the second opening. The second end includes a wall, and an axis extends through the first opening and through the wall Other aspects of the invention will become apparent by consideration of the detailed description and accompanying drawings.

Figure 1:
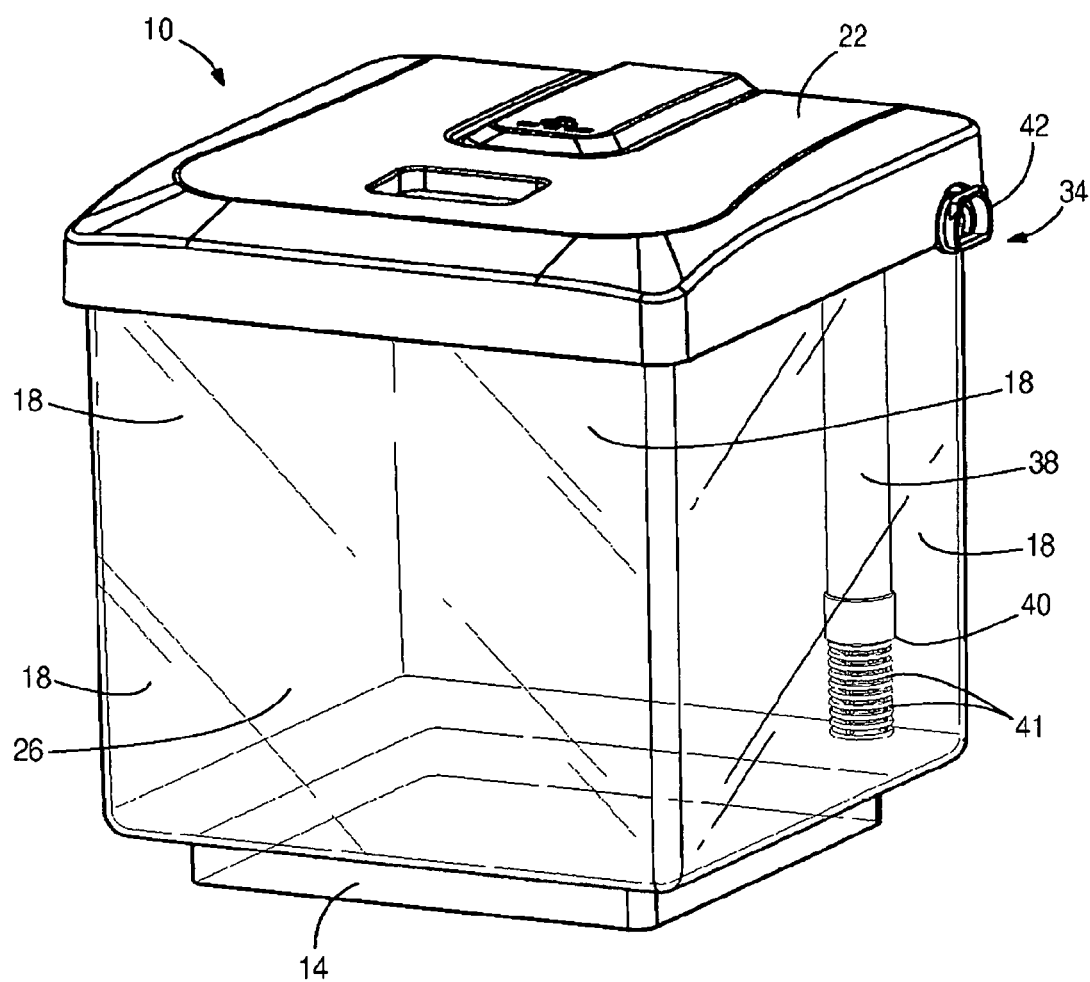
FIG. 1 is top perspective views of an aquarium according to one construction.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited.

DETAILED DESCRIPTION

FIGS. 1-10 illustrate an aquarium 10. The aquarium 10 includes a bottom 14, four side walls 18 extending upwardly from the bottom 14, and a cover 22 coupled to the side walls 18. The bottom 14, side walls 18, and cover 22 define an interior space 26. In some constructions the aquarium 10 includes more or fewer side walls 18 than that illustrated. For example, in some constructions the aquarium 10 is a bowl-shaped aquarium having a single, curved sidewall 18.

Figure 2:
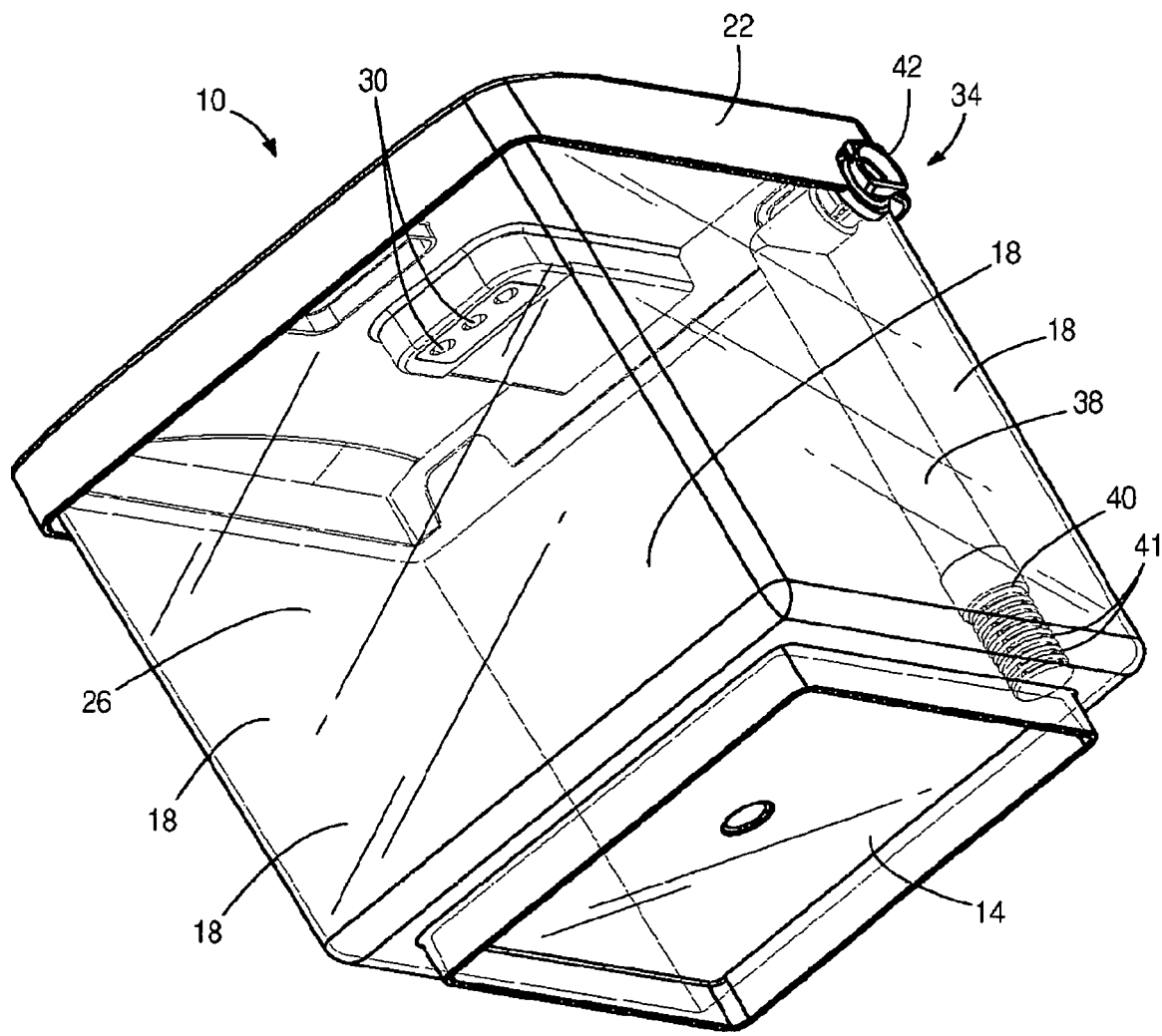
FIG. 2 is a bottom perspective view of the aquarium of FIG. 1.
Figure 3:
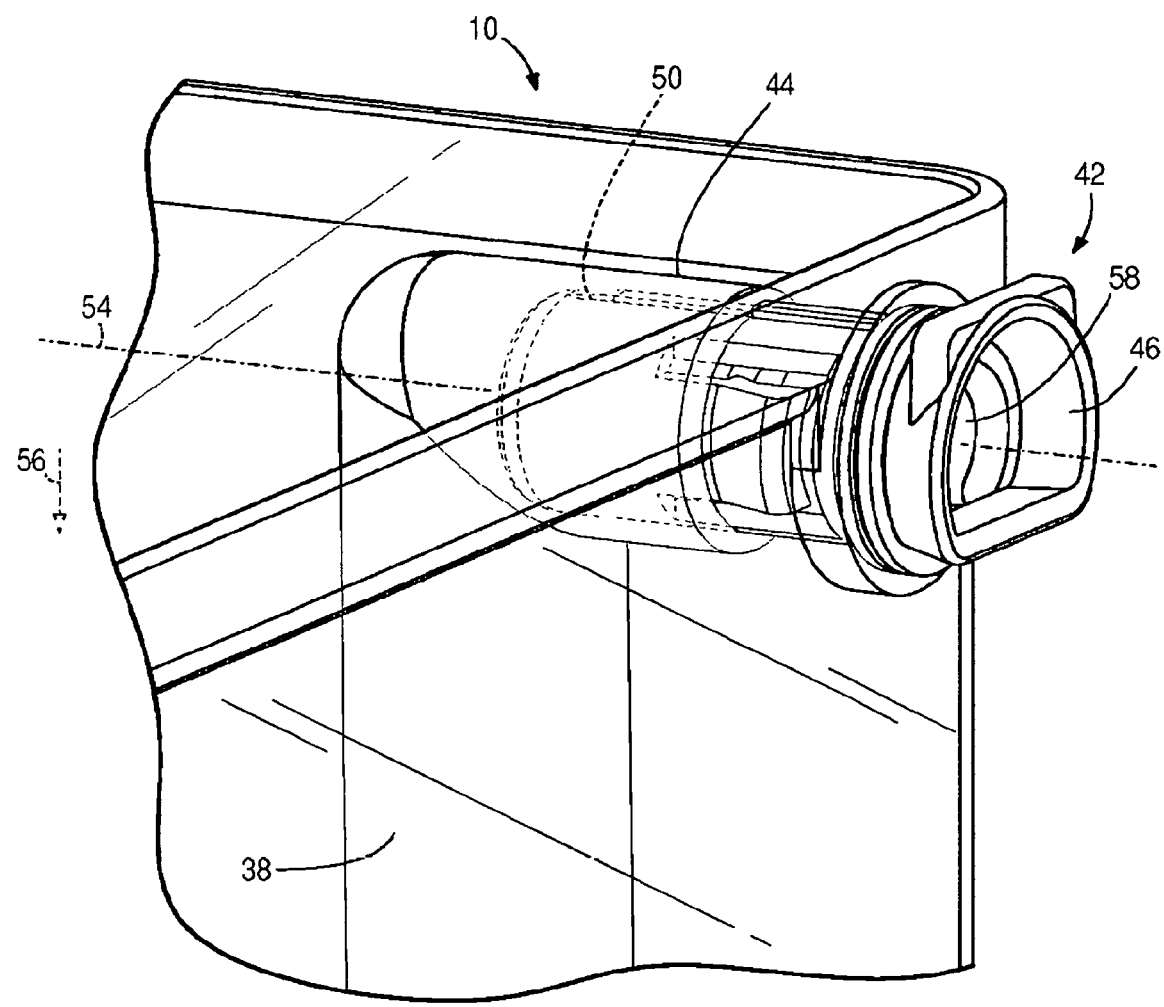
FIG. 3 is a perspective view of a water change system for the aquarium of FIG. 1.
Figure 4:
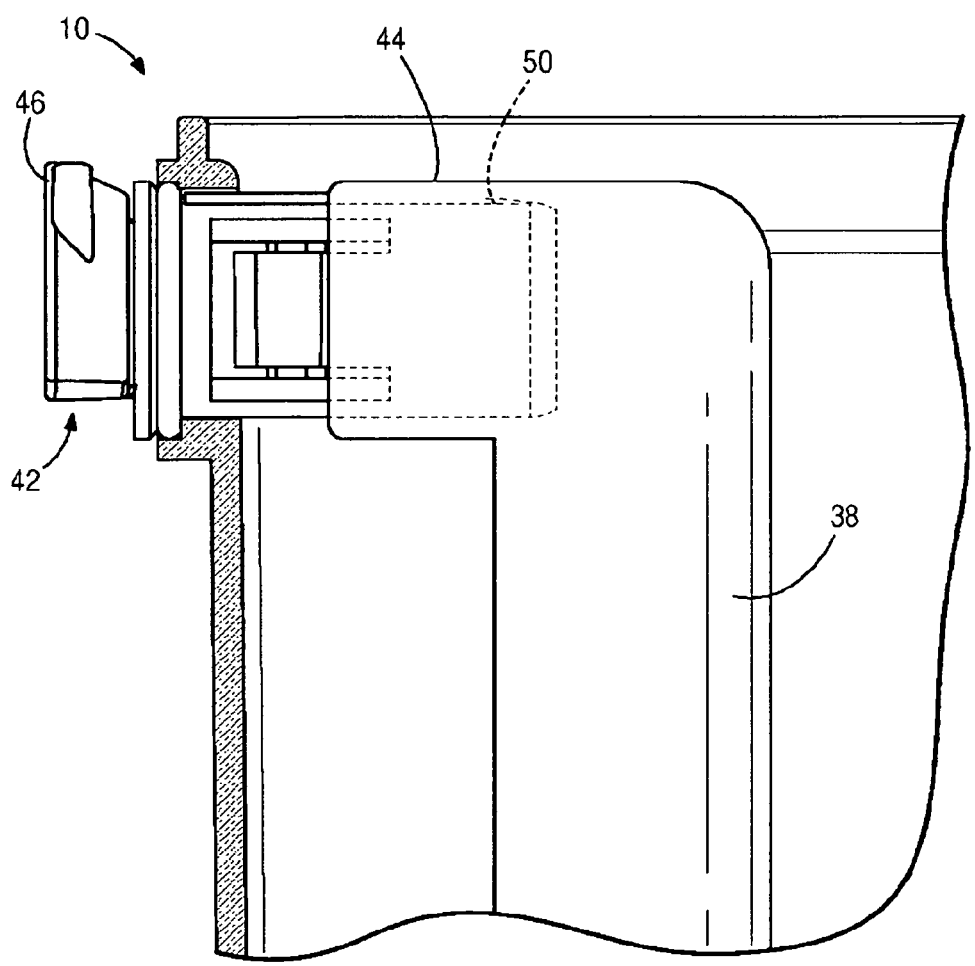
FIG. 4 is a side view of the water change system.

With reference to FIG. 2, in the illustrated construction the cover 22 includes at least one light element 30 (e.g., LED) that directs light into the interior space 26. The cover 22 is removably coupled to the side walls 18. In other constructions the aquarium 10 does not include a cover 22, or does not include any light elements 30.

With reference to FIGS. 1-10, the aquarium 10 includes a water change system 34 that is used to remove old (e.g., dirty) water from the interior space 26. The water change system 34 includes an elongate tube 38 that is at least partially within the interior space 26 and extends from a lower portion of the interior space 26 to an upper portion of the interior space 26. In the illustrated construction the elongate tube 38 is a plastic tube, although other constructions include different types of materials. The elongate tube 38 is open at a bottom end 40 to allow dirty water to enter the elongate tube 38. The bottom end 40 may be located, for example, adjacent the bottom 14 of the aquarium 10, and/or spaced by a small gap from the bottom 14. In some constructions the bottom end 40 includes a single aperture 41 to permit entry of dirty water into the tube 38. In other constructions, such as the illustrated construction, the bottom end 40 includes a plurality of apertures 41 (e.g., slits, holes, etc.) to permit entry of dirty water into the tube 38. While the illustrated elongate tube 38 extends generally alongside one of the side walls 18, in other constructions the elongate tube 38 extends along a different one of the side walls 18, or is spaced more centrally within the aquarium 10. Additionally, while the illustrated elongate tube 38 has a linear profile along substantially its entire length, in other constructions the elongate tube 38 may have a curved profile.

Figure 5:
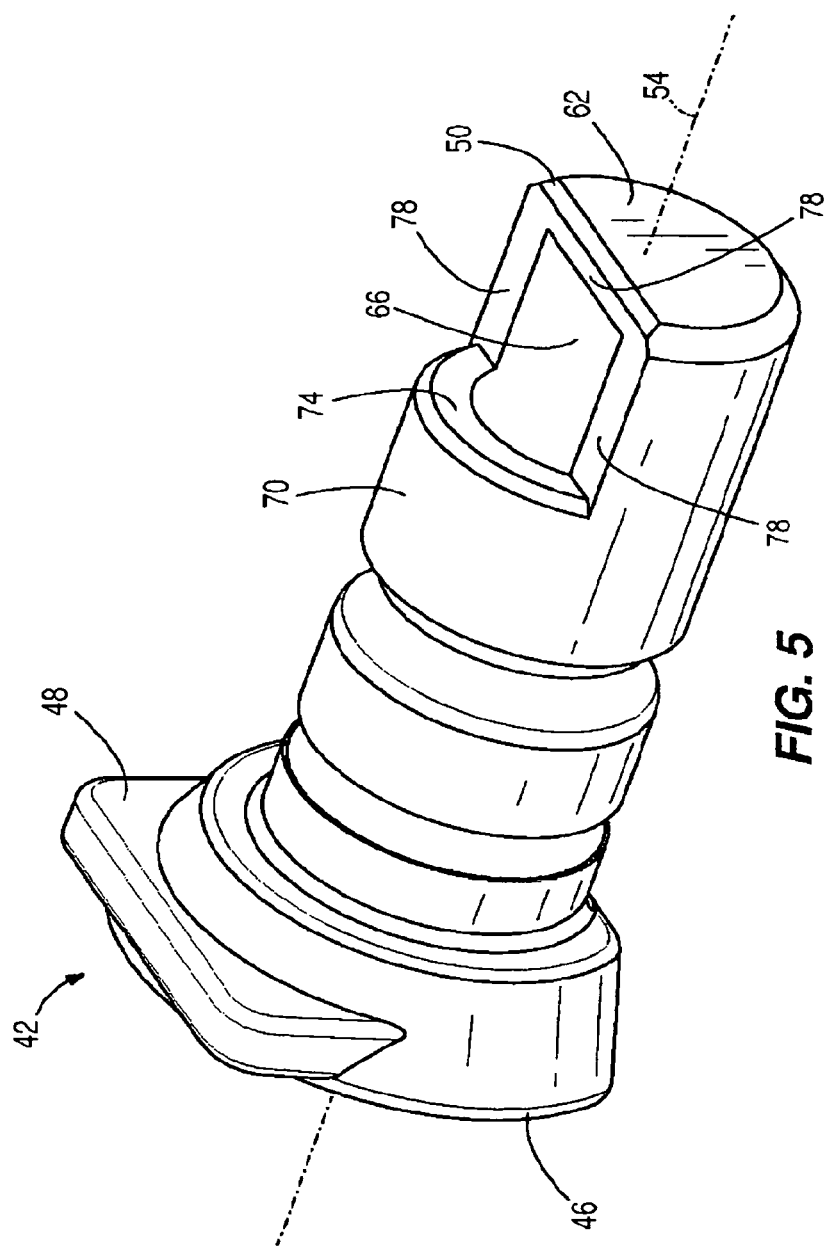
FIG. 5 is a perspective view of a spout of the water change system.
Figure 6:
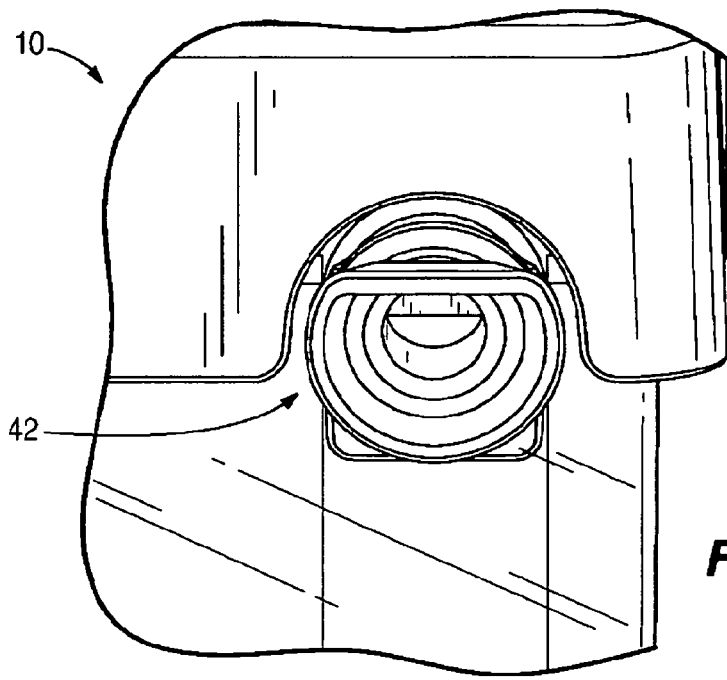
FIG. 6 illustrates the spout in a first position.

With continued reference to FIGS. 1-10, the water change system 34 further includes a spout 42 that is coupled to the elongate tube 38 at the upper end of the interior space 26. In the illustrated construction the elongate tube 38 includes a hollow L-shaped upper end 44 that receives the spout 42 (e.g., frictionally). The spout 42 is releasably coupled to the elongate tube 38, and protrudes out of the interior space 26. As illustrated in FIGS. 3-7, the spout 42 is an elongate structure that includes a first end 46 with a protruding finger grip 48, and a second opposite end 50. The spout 42 extends along an axis 54 (FIG. 3) that is generally perpendicular to a gravity vector 56. The spout 42 includes a first opening 58 at the first end 46. In the illustrated construction the first opening 58 is generally a circular opening. The axis 54 extends through the first opening 58. The spout 42 includes a wall 62 (FIG. 5) at the second end 50. The axis 54 extends through the wall 62, in a direction perpendicular to the wall 62. The spout 42 also includes a second opening 66 along a side 70 of the spout 42 between the first end 46 and the second end 50. The second opening 66 is adjacent the wall 62, and is spaced from the first opening 58. In the illustrated construction the second opening 66 is a non-circular opening. As illustrated in FIG. 5, the spout 42 has a generally cylindrical shape, such that the second opening 66 is formed by a cut-out or removed portion of the cylindrical spout 42. For example, in the illustrated construction the second opening 66 is defined by a first, arcuate surface 74 and three additional surfaces 78 that each extend in a plane that is perpendicular to a plane that contains the first surface 78. Other constructions include different shapes and sizes for the opening 66 than that illustrated.

Figure 7:
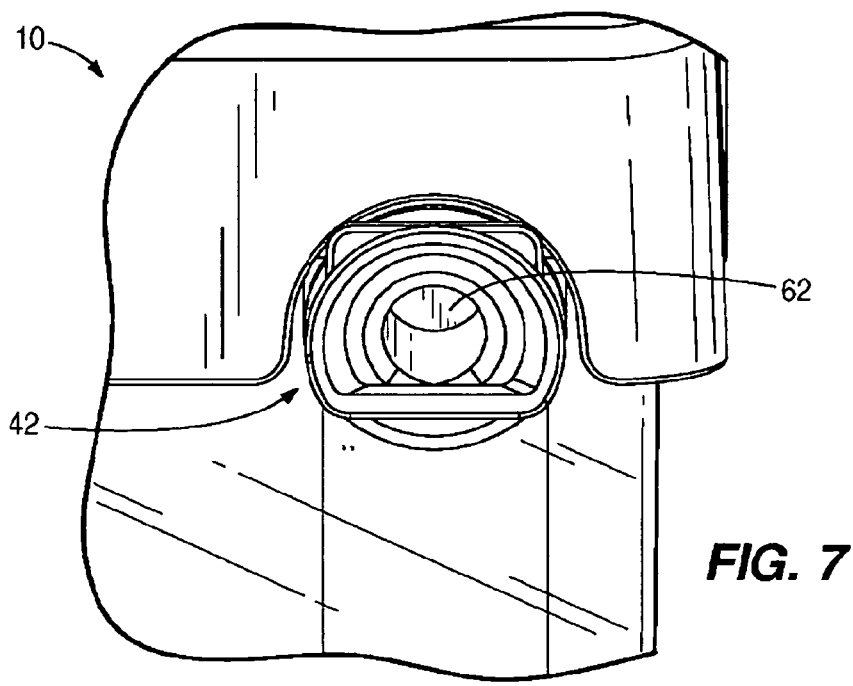
FIGS. 7-9 illustrate the spout in a second position.
Figure 8:
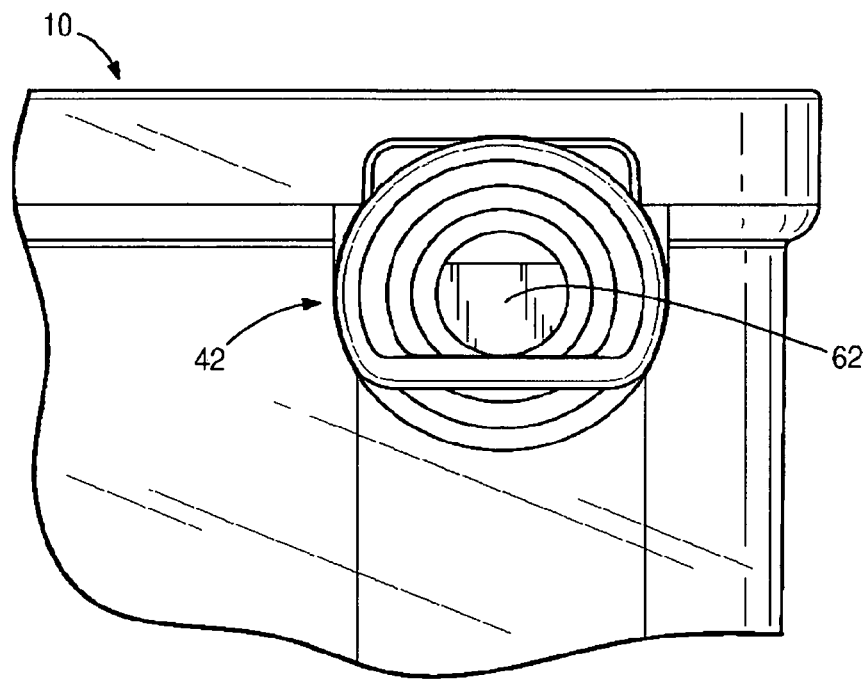
Figure 9:
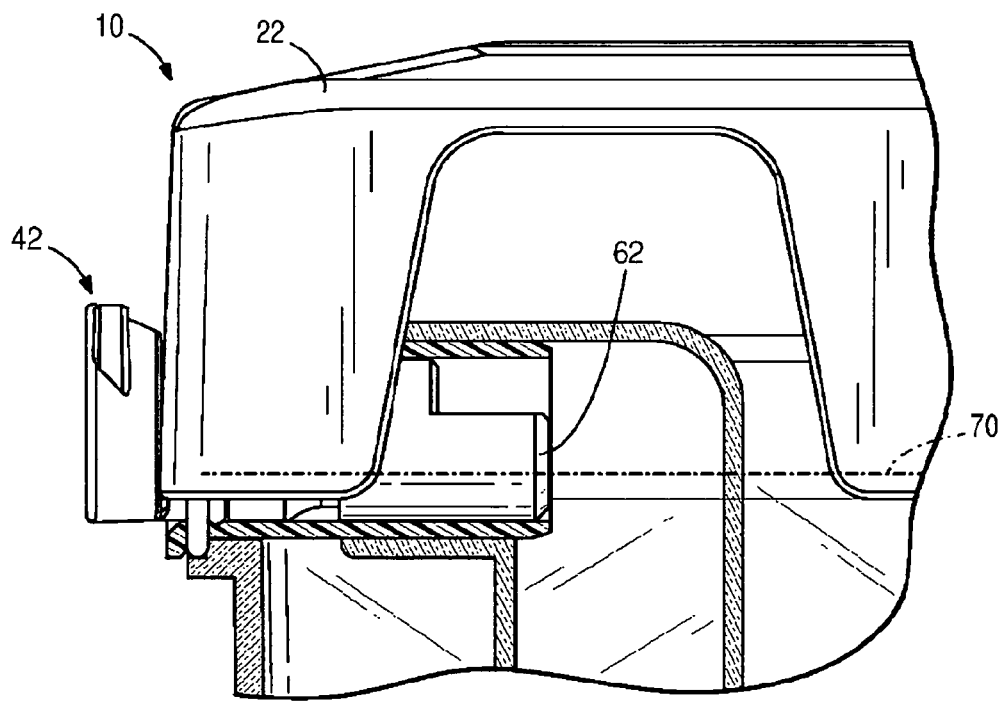
Figure 10:
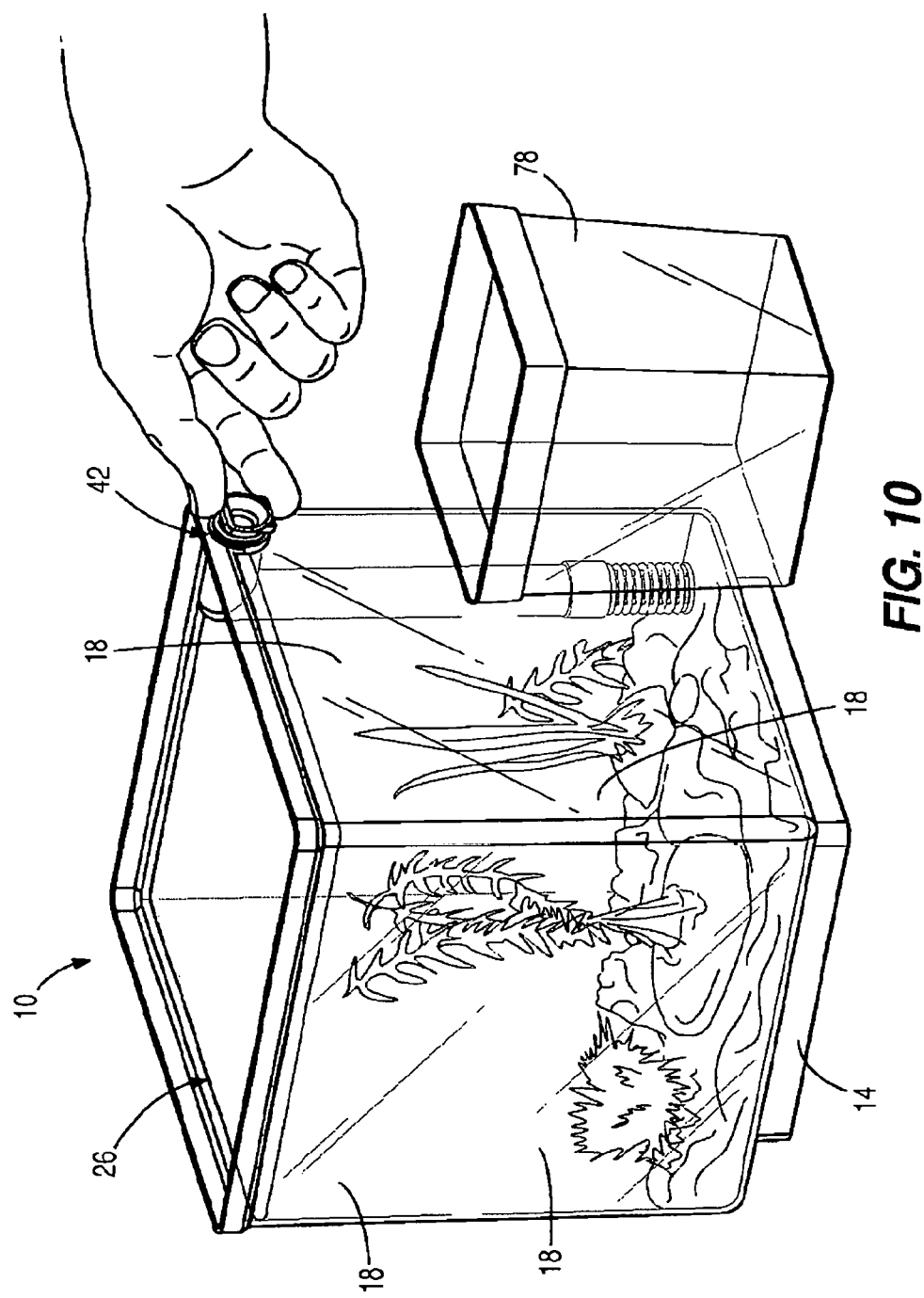
FIG. 10 illustrates a user manually switching the spout between the first and second positions.

With reference to FIGS. 6-10, the spout 42 may be rotated (e.g., via hand as illustrated in FIG. 10) between a first position (FIG. 6) and a second position (FIGS. 7-9). For example, the finger grip 48 may be grasped, and the spout 42 may be rotated within the upper end 44 of the elongate tube 38. In some constructions the upper end 44 may include a rail, groove, bearing. or other structure to facilitate rotation of the spout 42. In the first position, dirty water from the aquarium 10 is permitted to move up the elongate tube 38 and into the spout 42 through the second opening 66. For example, a user may remove the cover 22 and pour clean water into the interior space 26. The clean water forces any dirty water to pass into the bottom end 40 off the elongate tube 38 and work its way up the elongate tube 38 toward the spout 42. In this first position of the spout 42, the second opening 66 is facing down (i.e., toward the bottom 14 of the aquarium 10). The dirty water may thus easily pass through the second opening 66 and into the spout 42, and then pass out of the spout 42 through the first opening 58 and into a water collection container 78 (FIG. 10).

In the second position (FIGS. 7-9), the spout 42 has been rotated (e.g., 180 degrees). The second opening 66 is thus facing upwards (see also FIG. 5). In this position, it is much more difficult for any water to pass into the spout 42. In particular, in this second position, the wall 62 serves to block or inhibit entry of water into the spout 42. As illustrated in FIG. 9, in this second ("closed") position a water line 70 in the aquarium (illustrated schematically in dashed line) is at a level with the wall 62, the water line referring to a water line after a water change when clean water has been added to the aquarium 10. Thus, the wall 62 inhibits or prevents any water from entering the spout 42. Even if the aquarium 10 is bumped slightly or tipped slightly, the wall 62 will generally still prevent or inhibit water from entering the spout 42, since the wall 62 extends well above the water line 70. Because of the wall 62, the spout 42 is unlikely to drip any water in the second position.

By utilizing a spout 42 as that illustrated and described above, a user may easily change out dirty water in an aquarium by simply rotating the spout 42 to the first position, adding clear water into the aquarium, and collecting the dirty water with the water collection container 78. When the dirty water has been collected the user may then simply rotate the spout 42 back to the second position.

Although the invention has been described in detail with reference to certain preferred embodiments, variations and modifications exist within the scope and spirit of one or more independent aspects of the invention as described.

The invention claimed is:

1. A water change system for a tank having a liquid disposed in an interior, the water change system comprising:
   an elongate tube disposed at least partially within the interior and including an open first tube end disposed in a lower half of the tank;
   a spout coupled to a second tube end of the elongate tube, the second tube end opposite the first tube end and disposed in an upper half of the tank, the spout including a cylindrical wall, an end wall, a first opening and a second opening spaced from the first opening, the second opening formed in a portion of the cylindrical wall such that the entire aperture is formed on one side of a central axis of the spout, wherein the spout is rotatable between a first position wherein the second opening is disposed below a desired waterline to permit water to enter the second opening and pass out of the first opening, and a second position wherein the second opening is above the desired waterline to inhibit water from entering the second opening.

2. The water change system of claim 1, wherein the spout includes a first end and a second end, wherein the first opening is disposed at the first end and the second opening is disposed at the second end.

3. The water change system of claim 2; wherein the second end includes a wall, wherein an axis extends through the first opening and through the wall, and wherein the second opening is disposed adjacent the wall.

4. The water change system of claim 3, wherein the axis is configured to extend perpendicular to a gravity vector.

5. The water change system of claim 2, wherein the spout includes a protruding finger grip at the first end.

6. The water change system of claim 1, wherein the first opening is a circular opening, and wherein the second opening is a non-circular opening.

7. The water change system of claim 1, wherein the spout has a generally cylindrical shape, and wherein the second opening is formed by a cut-out.

8. The water change system of claim 1, wherein the second opening is defined by a first, arcuate surface and three additional surfaces that each extend in a plane that is perpendicular to a plane that contains the first surface.

9. The water change system of claim 1, wherein the elongate tube includes a bottom end having at least one aperture configured to receive dirty water.

10. The water change system of claim 1, wherein the elongate tube includes an upper L-shaped hollow end configured to receive the spout.

11. An aquarium comprising:
    a bottom;
    at least one side wall extending from the bottom, the bottom and side wall defining an interior space;
    an elongate tube disposed at least partially within the interior space and including a first tube end disposed within a lower portion of the space and a second tube end disposed in an upper portion of the space; and
    a spout coupled to the second tube end and passing through the side wall, the spout including a cylindrical surface, a first opening and a second opening spaced from the first opening, the second opening formed in a portion of the cylindrical wall such that the entire aperture is formed on one side of a central axis of the spout, wherein the spout is rotatable between a first position wherein the second opening is disposed below a desired waterline to permit water to enter the second opening and pass out of the first opening, and a second position wherein the second opening is above the desired waterline to inhibit water from entering the second opening.

12. The aquarium of claim 11, wherein the elongate tube extends from a lower portion of the interior space adjacent to the bottom, to an upper portion of the interior space.

13. The aquarium of claim 11, further comprising a cover coupled to the at least one side wall.

14. The aquarium of claim 13, wherein the cover includes at least one light-emitting diode.

15. The aquarium of claim 11, wherein the at least one side wall includes four side walls.

16. The aquarium of claim 11, wherein the elongate tube extends generally alongside the at least one side wall.

17. The aquarium of claim 11, wherein the spout protrudes out of the interior space.

18. The spout of claim 11, wherein the first opening is a circular opening and the second opening is a non-circular opening.

* * * * *